US005989383A

United States Patent [19]

Zarembo et al.

[11] Patent Number: 5,989,383

[45] Date of Patent: Nov. 23, 1999

[54] METHOD FOR INSERTING MARKERS INTO BOOKS

[75] Inventors: Peter J. Zarembo, Shoreview, Minn.; Donald P. DeVale, Bloomingdale, Ill.; William R. Weber, III, Vadnais Heights; Norman L. Koning, Hastings, both of Minn.; Paul J. Michels, Chicago Ridge, Ill.

[73] Assignee: 3M Innovative Properties Company, St.Paul, Minn.

[21] Appl. No.: 09/184,997

[22] Filed: Nov. 3, 1998

Related U.S. Application Data

[62] Division of application No. 08/622,575, Mar. 25, 1996, Pat. No. 5,833,793.

[51] Int. Cl.[6] .......................... B32B 31/00; B44C 31/00; B29C 30/38

[52] U.S. Cl. .......................... 156/293; 156/423; 156/542; 156/DIG. 37

[58] Field of Search .................... 156/DIG. 37, DIG. 42, 156/542, 541; 271/33; 221/210

[56] References Cited

U.S. PATENT DOCUMENTS

| | | | |
|---|---|---|---|
| Re. 23,668 | 6/1953 | Von Hofe | 216/55 |
| 2,106,964 | 2/1938 | Balton | 221/211 |
| 2,124,670 | 7/1938 | Johnson | 221/211 |
| 2,257,785 | 10/1941 | Carter | 271/33 X |
| 3,765,007 | 10/1973 | Elder | 340/280 |
| 3,797,875 | 3/1974 | Den Hamer | 221/210 X |
| 4,717,438 | 1/1988 | Benge et al. | 156/152 |
| 4,721,197 | 1/1988 | Hoffman | 221/210 X |
| 4,773,961 | 9/1988 | Glorioso | 156/361 |
| 4,900,386 | 2/1990 | Richter-Jorgensen | 156/250 |
| 4,967,185 | 10/1990 | Montean | 340/572 |
| 5,322,190 | 6/1994 | Bartley | 221/210 X |
| 5,331,313 | 7/1994 | Koning | 340/551 |
| 5,393,368 | 2/1995 | Stevens | 156/577 |
| 5,733,409 | 3/1998 | Turnbull et al. | 156/DIG. 32 X |
| 5,843,272 | 12/1998 | DeVale et al. | 156/542 |

FOREIGN PATENT DOCUMENTS

| | | | |
|---|---|---|---|
| 21663/77 | 8/1977 | Australia . | |
| 29437/77 | 4/1979 | Australia | B65C 3/00 |
| 87011/82 | 5/1983 | Australia | B65C 9/18 |
| 33604/84 | 11/1984 | Australia | B65C 9/18 |
| 34866/84 | 5/1986 | Australia | B65C 9/18 |
| 56543/86 | 10/1986 | Australia | B65C 9/36 |
| 2132054 | 3/1995 | Canada . | |
| 0 286 343 A2 | 10/1988 | European Pat. Off. | B65H 35/00 |
| 0 286 343 A3 | 10/1988 | European Pat. Off. | B65H 35/00 |
| 0 353 688 | 3/1991 | European Pat. Off. | B42D 9/00 |
| 2607779 | 6/1988 | France | B65C 09/36 |
| 44 04 103 | 8/1994 | Germany | B65H 35/10 |
| WO 97/35799 | 10/1997 | WIPO | B65H 37/00 |

*Primary Examiner*—David A. Simmons
*Assistant Examiner*—Sue A. Purvis
*Attorney, Agent, or Firm*—Peter L. Olson

[57] ABSTRACT

A marker insertion apparatus automatically removes a marker from a roll of marker material and applies the marker to an applicator. The markers mount to a backing sheet and are peeled from the sheet by passing over a peel bar. Jaws are positioned near the peel bar and configured for gripping an end marker. An applicator member inserts intermediate the jaws and has the end marker pressed onto the applicator and torn from the roll. In a first embodiment, the applicator is a paddle applicator for inserting markers between opposing pages, and in a second embodiment the applicator is a bayonet applicator for inserting markers into the spine of a book.

3 Claims, 6 Drawing Sheets

METHOD FOR INSERTING MARKERS INTO BOOKS

This is a division of application Ser. No. 08/622,575 filed Mar. 25, 1996, now U.S. Pat. No. 5,833,793.

BACKGROUND OF THE INVENTION

1. Field of the Invention

The present invention is directed to a method and apparatus for inserting a marker into a book near the binding.

2. Description of the Prior Art

Theft is a continually growing problem in society, requiring additional security measures to minimize theft. In particular, many stores and other places of business have installed electronic article surveillance systems (EAS) for controlling unauthorized removal of articles. Such systems use a single or dual status ferromagnetic marker attached to an article with systems placed at exits which detect the markers and sound an alarm.

Bookstores and libraries have special problems with theft of books, which are easily concealed. Libraries rarely have surveillance systems and typically have very limited resources for security personnel. Libraries cannot afford the expense of stolen books and, in many instances, libraries lose books which are very rare and irreplaceable. Bookstores try to minimize shoplifting of expensive inventory which is easily accessible and which may be difficult to monitor in crowded stores.

Special EAS systems have been developed for libraries and bookstores. The markers and attachment methods used with clothing and many other articles cannot be easily attached to books without damaging the book. EAS ferromagnetic markers for use in books are typically long narrow strips that are manually inserted between two opposing pages of a book, close to and extending substantially parallel to the binding. Such a marker is shown in U.S. Pat. No. 5,331,313, assigned to Minnesota Mining and Manufacturing Company. Each side of the marker is typically coated with an adhesive to secure the marker to the book pages. When properly placed, the markers are difficult to visually detect, difficult to remove, and do not detract from the reader's ability to read and enjoy the book. The markers must be deactivated when articles marked with them are checked out of libraries or purchased in stores so that an alarm does not sound.

It can be appreciated that for such systems to function effectively, all the books in a library collection must include a detectable marker. The markers heretofore have. been manually removed from a box of markers and inserted into a book. Manual removal and insertion of markers in libraries may be acceptable when the collection is quite small, however manual insertion methods may not be acceptable with larger collections.

The markers are typically manufactured in a roll on a backing sheet with an adhesive backing on both the front and back to adhere to the pages of the book. Individual strips are cut from the roll for insertion. Each marker includes overlapping backing material on each face. The process of removing an individual backing sheet from the adhesive coated marker and manually inserting and positioning each individual marker is very laborious, expensive and time consuming for large collections.

In addition to time and expense involved with manual. insertion, the quality of positioning each marker may vary with hand placement. It is appreciated that if markers having adhesive on both sides are placed on the page too far from the binding, it will be more difficult for the reader to turn the pages and the pages between which the marker is inserted will not be sufficiently separated and may be difficult to read. Similar problems also occur should the marker be placed into the book is a skewed or bowed manner. The removal and insertion of the markers by hand may also unduly stress or otherwise damage the markers. When this occurs, signal loss may become great enough that the markers may not be accurately detected.

With some types of books, the binding includes a spine. portion with a space between the cover and the spine. However, insertion of markers into the space is difficult as the space may only be accessed from the ends of the book. As the markers have an adhesive placed thereon, it is difficult to slide the markers into the end of the opening without the adhesive adhering to portions of the book at the wrong position.

As access to books is somewhat difficult in some libraries, often requiring a ladder to reach, it is important that the books need not necessarily be transported to a central location for marker insertion. Therefore it will be appreciated that if an insertion device is mobile so that it may be brought either into the aisles between book shelves or at least to different locations within the library, the work involved in transporting books is decreased.

It can be seen then, that a new and improved apparatus and method for marker insertion are needed for inserting a detection marker between opposing pages of a book or into the spine of a book. It can be appreciated that such a device should provide for properly positioning and aligning a marker in a book in a rapid manner. In addition, the device should provide for automatically removing the markers from a roll or other packaging of multiple markers. The device should be adaptable for inserting markers into a variety of sizes and types of books. The present invention addresses these as well as other problems associated with removal, insertion and placement of detectable markers used with books.

SUMMARY OF THE INVENTION

The present invention is directed to a marker insertion apparatus and method. According to the present invention, an insertion apparatus removes markers from a roll and applies them to an applicator for insertion into a book.

The insertion apparatus includes a roll which is retained within a housing and feeds out separated markers on a backing sheet. A take-up reel is driven by a motor which pulls the material off the supply spool. A weight on the supply spool prevents the supply roll from over-rotating and feeding out too much material. The marker material is fed past a peel bar and directed by guide rollers.

The insertion apparatus is adaptable for several types. of applicator members, including a first paddle type applicator for inserting markers between opposed pages of a book and a bayonet type applicator for inserting markers into the spine of the book.

The markers are removed from the backing sheet by forcing the backing sheet over a peel bar which peels the endmost marker away from the backing sheet. When the endmost sheet has been peeled away from the backing sheet, the supply of marker material is clamped to prevent it from feeding out. An applicator is placed between movable jaws and the jaws close onto the applicator and the endmost marker. At this position, the clamped jaws, applicator and endmost marker are pulled away from the next adjacent marker so that the endmost marker is separated from the roll. The marker sticks to the applicator member, either the bayonet type applicator or paddle type applicator. The jaws are opened so that the applicator may be removed and the marker inserted into the book.

These features of novelty and various other advantages which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

In the drawings, wherein like reference letters and numerals indicate corresponding elements throughout the several views.

DETAILED DESCRIPTION OF THE PREFERRED EMBODIMENT

Figure 1:
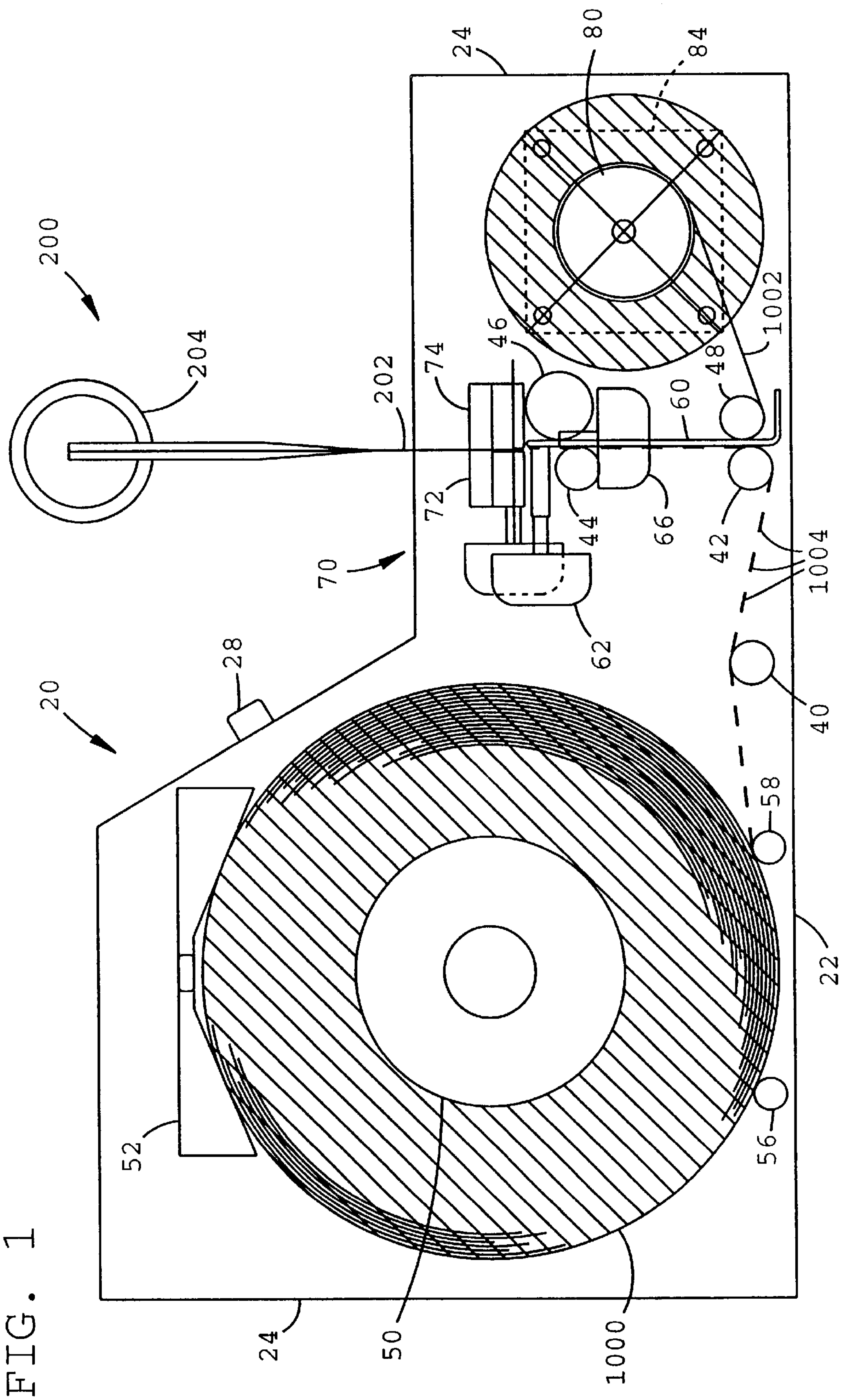
FIG. 1 shows a side sectional view of a marker insertion apparatus according to the principles of the present invention.
Figure 2:
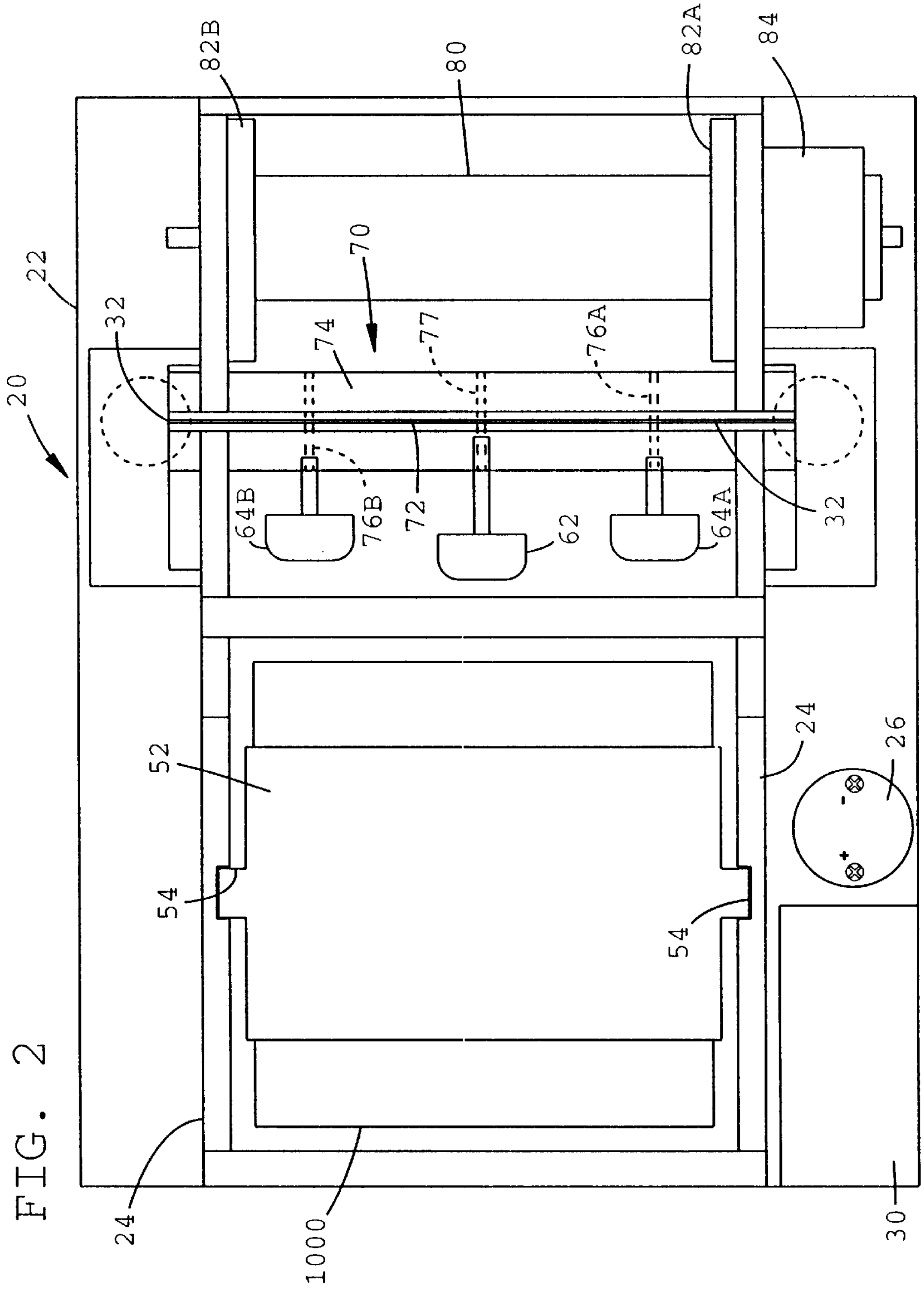
FIG. 2 shows a top sectional view taken along line 2—2 of FIG. 1.

Referring now to the Figures, and in particular to FIGS. 1 and 2, there is shown a marker insertion apparatus, generally designated 20. The marker insertion apparatus 20 includes a housing 24 mounted on a base 22. As shown in FIG. 2, the marker insertion apparatus 20 also includes a battery or other power supply 26 and may include a display panel, screen or ready light 28, depending on user needs. In addition, a central processor or control circuitry 30 operates the various mechanisms associated with the marker insertion apparatus 20, as explained hereinafter. A slot 32 is formed in the top and sides of the housing 24 providing access for applicators to the separated markers.

As shown in FIGS. 1 and 2, a supply spool 50 supports. a roll 1000 of marker material. In the preferred embodiment, the marker material includes adhesive covered markers 1004 mounted to a backing sheet 1002. Each marker 1004 is separate from the next adjacent marker, however, the adhesive layer on the faces of the markers generally creates a connective layer, as shown most clearly in FIGS. 7–9. For some applications, the roll 1000 has adhesive applied to only one face, as explained hereinafter. The roll 1000 is supported on rods 56 and 58 which provide for feeding the markers out in a very simple manner, as shown in FIG. 1. A weight 52 engages vertical slots 54 in the housing 24, shown in FIG. 2, and provides tension against the roll 1000 so that it does not over-rotate and feed out too much material.

The markers 1004 are pulled through the insertion. apparatus 20 onto a take-up reel 80 which is driven by a motor 84. As shown in FIG. 2, alignment disks 82A and 82B at the ends of the take-up reel maintain the backing sheet 1002 in proper alignment. The length of marker material is guided through the apparatus on guide rollers 40, 42 and 44 to a peel bar 60, shown in FIG. 1. Following removal of the markers 1004, the backing sheet is directed over guide rollers 46 and 48 to the take-up reel 80.

Figure 7:
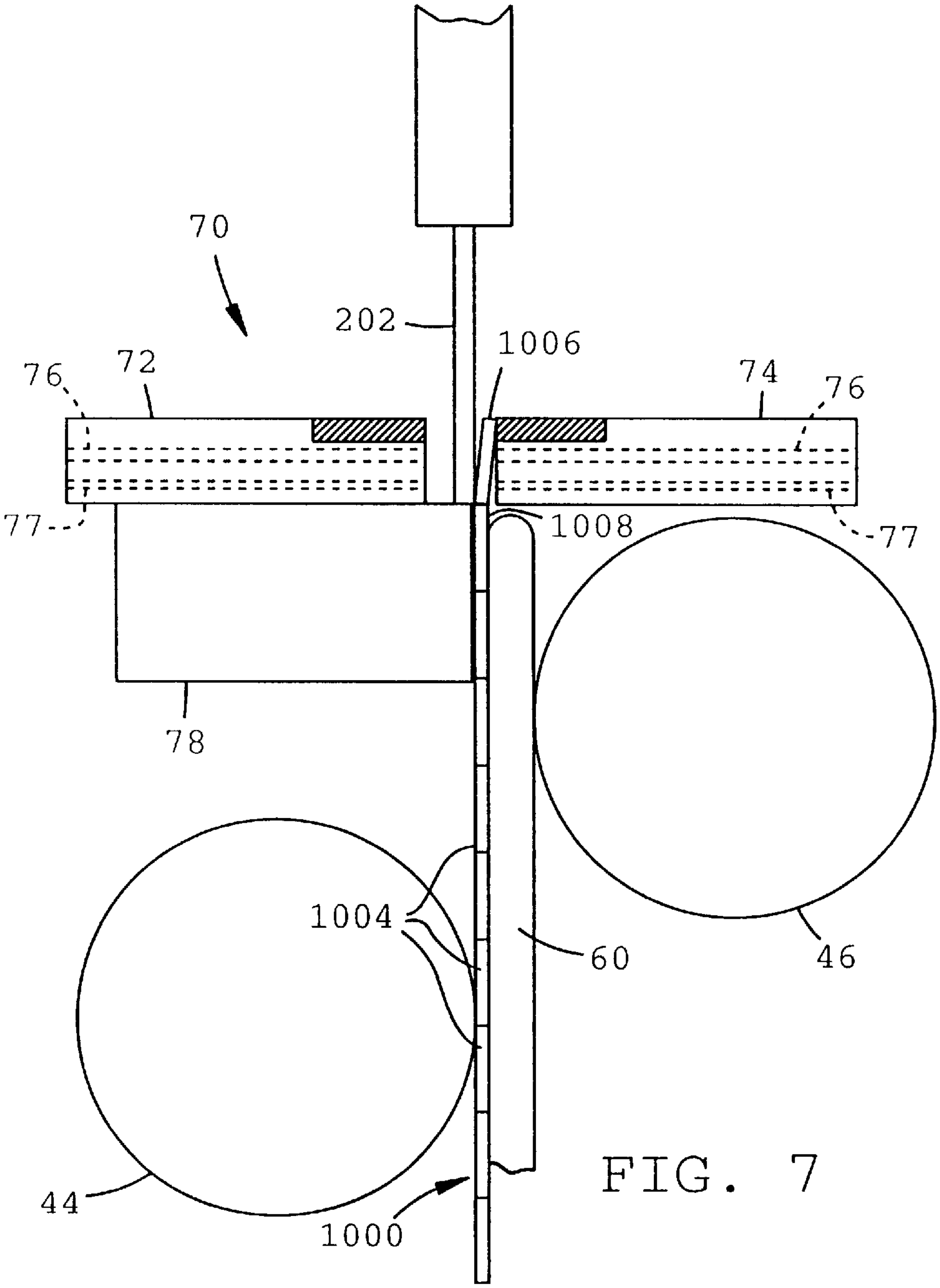
FIG. 7 shows a side sectional view of the separator jaws and the marker roll with an end marker separated from the backing sheet.

Referring now to FIG. 7, a jaw assembly 70 includes an alignment bar 78 and a first separator jaw 72 and a second separator jaw 74, movable between an open and a closed position, as explained hereinafter. As shown in FIG. 2, solenoids 64A and 64B provide for clamping the jaws 72 and 74. together onto an applicator member, as explained hereinafter. Sensors 76A and 7GB detect the presence of each end of an applicator member for controlling actuation of the solenoids 64A and 64B. Sensor 77 detects the presence of a marker in a ready position intermediate the jaws 72 and 74, as explained below. In addition, as shown in FIGS. 1 and 2, a retaining solenoid 62 engages the fed-out marker material 1004 to secure the material so that an end marker may be removed, as explained hereinafter. The jaw assembly 70 is vertically lifted for marker separation by solenoids 66A and 66B, as explained below.

Figure 3:
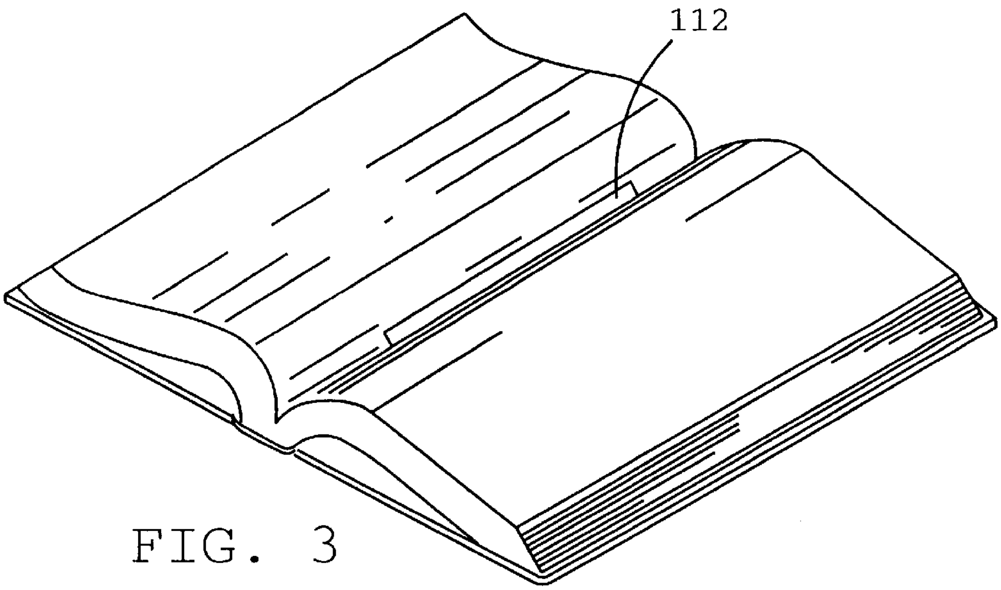
FIG. 3 shows a perspective view of a book with a marker inserted between opposing pages of the book.
Figure 5:
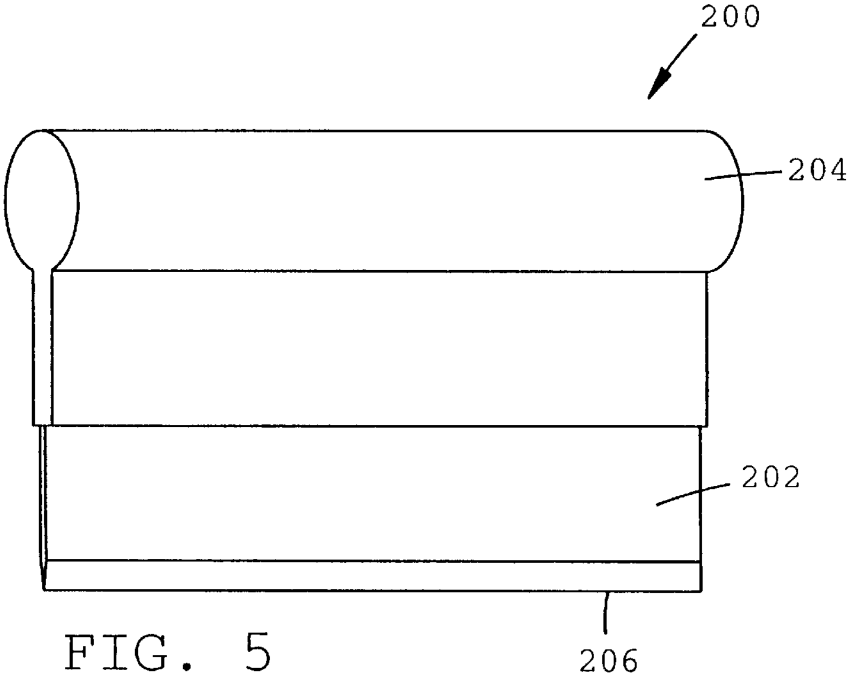
FIG. 5 shows a perspective view of a paddle type applicator for the marker insertion apparatus shown in FIG. 1.

According to the present invention, the separated markers are pressed onto an applicator member for insertion into a book. As shown in FIG. 5, according to a first embodiment of an applicator member, a paddle type applicator. 200 is shown. The paddle type applicator 200 includes a planar applicator portion 202 and a handle portion 204. The paddle type applicator 200 inserts into slot 32 in the housing 24, shown in FIGS. 1 and 2, which opens to both the side and the top of the housing. The slot 32 provides for receiving and aligning the paddle type applicator 200 from above. A marker is placed parallel to a bottom edge 206 of the applicator portion 204 and spaced upward slightly from the bottom edge 206. This placement provides for insertion of the paddle type applicator 200 into the book between opposing pages to place the marker in an aligned position, as shown in FIG. 3.

Figure 4:
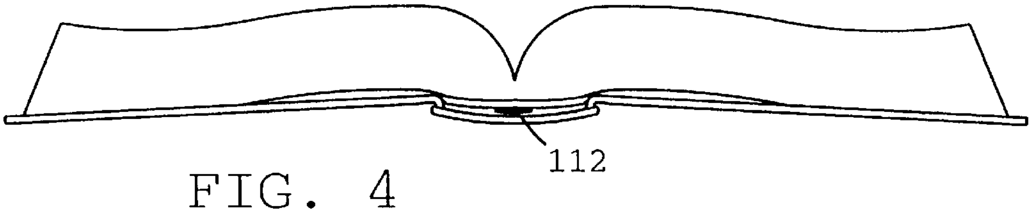
FIG. 4 shows an end view of a book with a marker inserted into the spine of the book.
Figure 6:
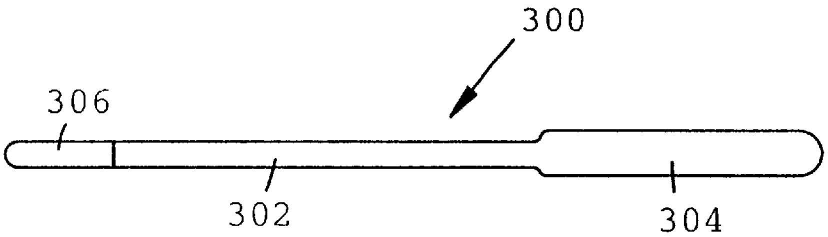
FIG. 6 shows a side elevational view of a bayonet type applicator for the marker insertion apparatus shown in FIG. 1.

Referring to FIG. 6, according to a second embodiment of an applicator member, a bayonet type applicator 300 is shown. The bayonet type applicator 300 includes a blade-type applicator portion 302 and a handle portion 304. The applicator blade portion 302 includes an end portion 306 having a tackier surface than the rest of the blade portion 302 for improved marker insertion, as explained below. The blade portion 302 inserts into the jaws 72 and 74 through the end of the slot 32, shown in FIGS. 1 and 2. The bayonet type applicator member 300 is configured so that the blade portion 302 may be inserted into the spine of the book, as shown in FIG. 4.

In another embodiment of the bayonet applicator 300, the blade portion 302 includes a tacky surface. In some uses, it is preferred that the marker 1012 adhere only to the binding. and not to the book cover over the binding. For such uses, the markers 1004 have adhesive applied to only one face. The adhesive free face is pressed against the blade portion 302. The end marker 1006 adheres to the tacky surface of the blade 302 and does not adhere to the non-stick surface of the jaws 72 and 74. However, the adhesive coated side of the marker 1012 has sufficient tackiness to adhere to the binding of the book, rather than the blade 302, as shown in FIG. 4.

Referring now to FIG. 7, it can be appreciated that the roll 1000 includes the markers 1004 and an end marker 1006 on the backing sheet 1002. Each of the markers 1004 is separate from the adjacent marker, but generally connected by the adhesive coating. The end marker 1006 may be separated by tearing the adhesive apart along a line extending between and defining the individual markers.

Operation

In operation, the insertion apparatus 20 must be loaded with a roll 1000 of markers 1004. The cover at the top of the insertion apparatus 20 is open to allow access to the interior of the housing. The roll is simply placed onto the guide rods 56 and 58. The end of the roll 1000 is then fed out through the guide rollers 40, 42 and 48. The peel bar 60 is slidably removable through the bottom of the insertion apparatus 20. When the marker material is fed to the take-up reel 80, the peel bar 60 is inserted up between the rollers 42 and 48. When the peel bar 60 is fully raised, the marker material is properly fed over the end of the peel bar 60 and between the guide rollers 44 and 46, as shown in FIG. 1. The end of the roll 1000 is attached to the take-up reel 80 by any of a number of methods. The width of the roll 1000 is very precisely manufactured with very small width tolerances so that alignment is maintained by the disks 82A and 82B. When the roll 1000 has been emptied, the backing sheet portion 1002 collected on the take up reel 80 may be removed and recycled or otherwise disposed.

In the preferred embodiment, the end of the roll typically has a starter portion so that the roll 1000 is fed out until the endmost marker 1006 is advanced to the edge of the peel bar 60, as shown in FIG. 7. It can be appreciated that the weight 52 is placed so that its end portions engage the slots 54 so that the weight 52 simply rests on top of the roll 1000. The force of the weight 52 provides resistance to prevent the roll from over-rotating and feeding out too much. material. Therefore, it can be appreciated that with the present invention, the proper roll advance is maintained by the drive motor 84 advancing the roll the width of one marker as detected by the sensor 77, while the supply of markers is maintained under tension by a simple weight. This provides for a very efficient and simple method for supplying markers and maintaining the roll under proper tension.

As shown in FIG. 7, the backing sheet 1002 is pulled over the peel bar 60 in a manner such that the endmost marker 1006 is peeled away from the backing sheet 1002. The radius of the end of the peel bar 60 must be small enough that it prevents the individual markers 1004 from bending to follow the radius, while allowing the more flexible backing sheet. 1002 to follow the radius, thereby separating the endmost marker 1006. It is also important that the distance between the peel bar 60 and the alignment bar 78 and the distance between the peel bar and the roller 46 not be too great so that the length of marker material 1004 does not loop outward away from the peel bar 60 and misfeed or misalign. As the endmost marker 1006 is peeled away from the backing sheet 1002, it is positioned intermediate the jaws 72 and 74 and detected by the sensor 77. At this position, the insertion apparatus 20 is substantially ready for placing a marker onto an applicator. The sensor 77 detects the presence of a marker and the solenoid 62 is actuated to clamp the roll of marker material 1004 uproll from the endmost marker 1006.

Figure 8:
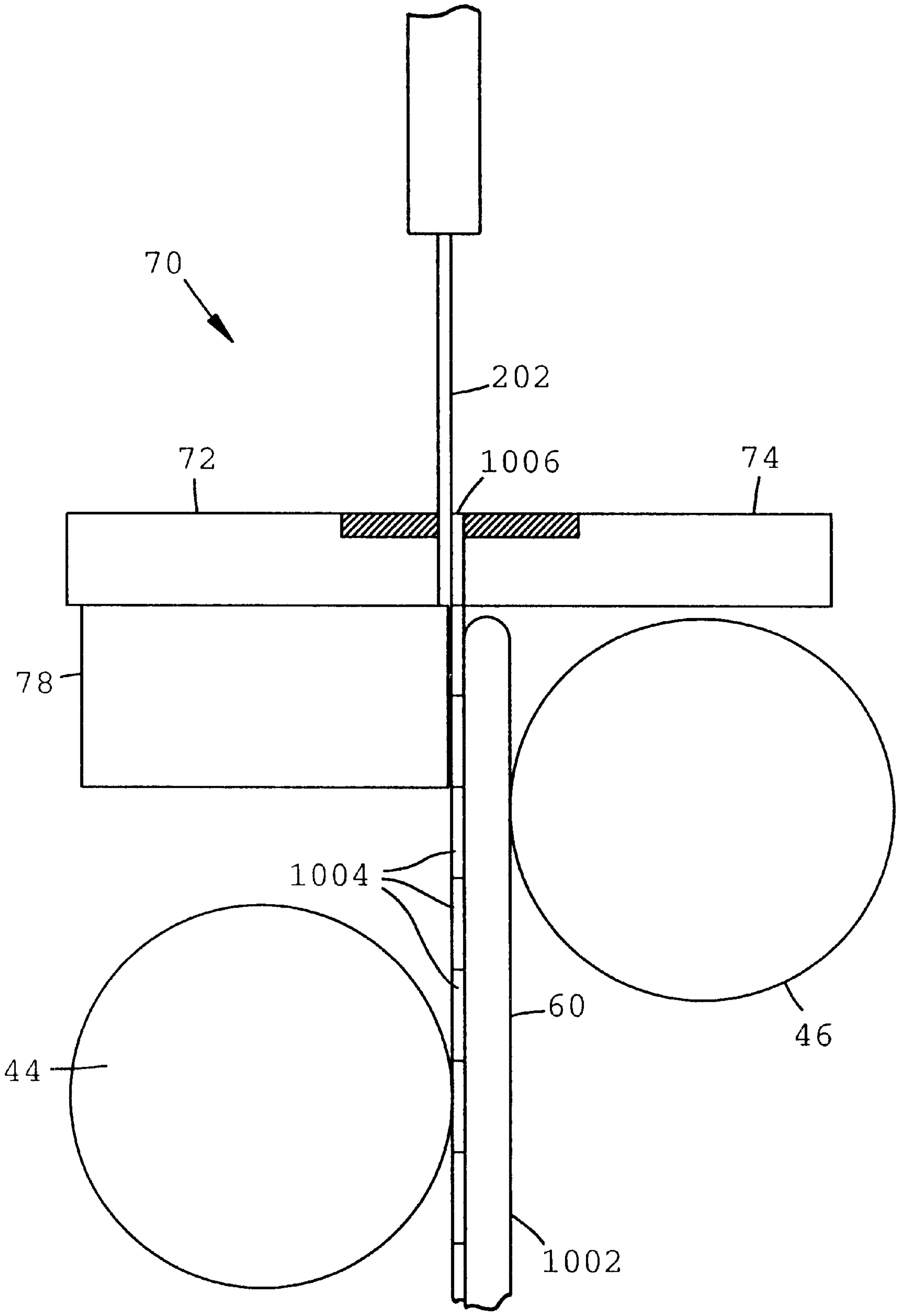
FIG. 8 shows a side sectional view of the separator jaws and the marker roll with an end marker and the paddle gripped by the jaws; and, FIG. 9 shows a side sectional view of the separator jaws and the marker roll with an end marker separated by the jaws and pressed onto the paddle.
Figure 9:
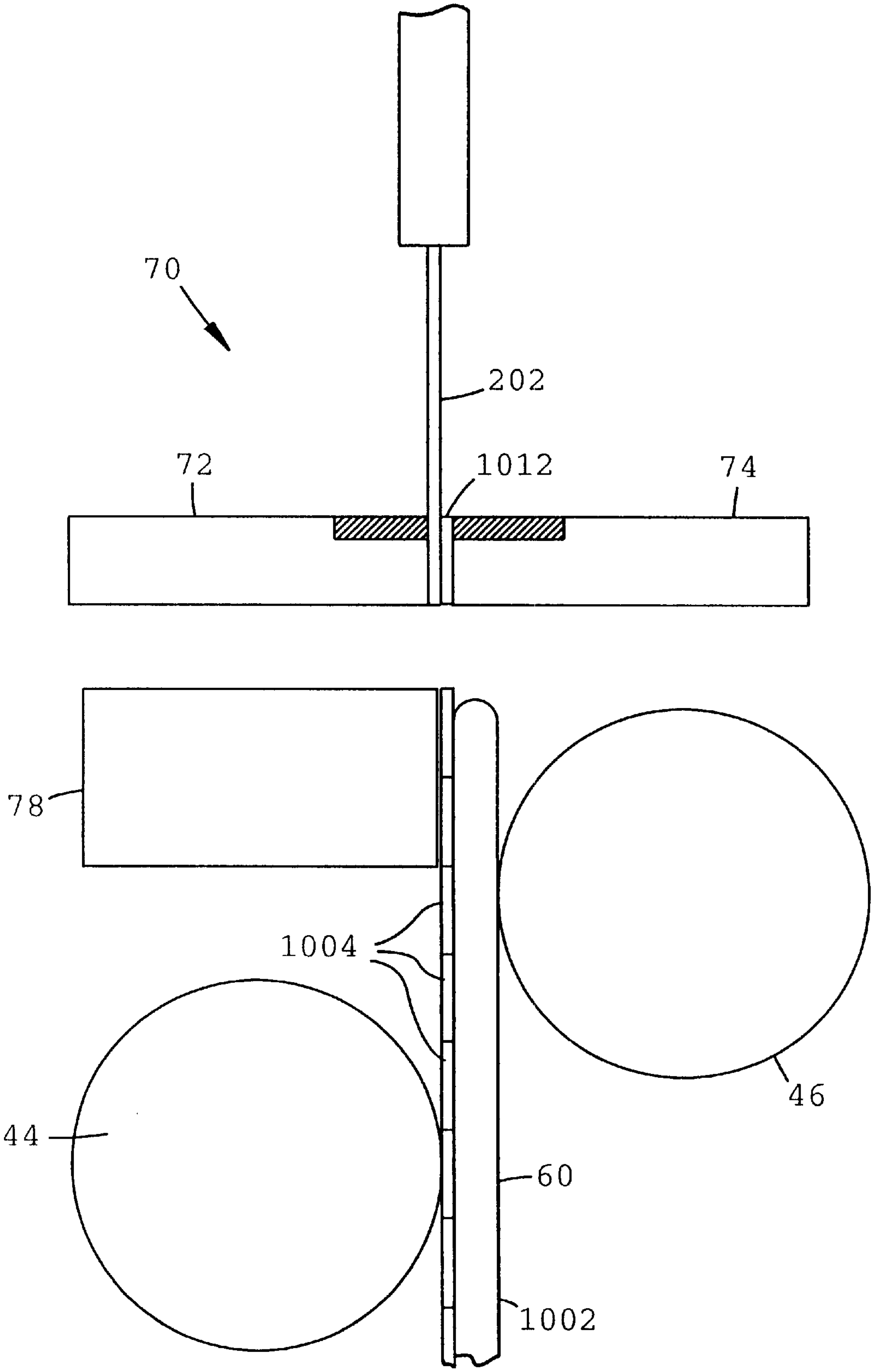

The applicator member, either 200 or 300, is inserted into slot 32 intermediate the jaws 72 and 74 and engaging the. alignment bar 78. The optical sensors 76A and 76B detect the presence of the applicator 200 or 300 in the proper position on the alignment bar 78. Following a delay after detection of a properly aligned applicator, the solenoids 64A and 64B are actuated to close the jaws 72 and 74. The delay allows the holder of the applicator 200 or 300 to press the applicator fully against the alignment bar 78. The motion of the solenoids 64A and 64B clamps the endmost marker 1006 against the applicator member 200 or 300 and intermediate the jaws 72 and 74, as shown in FIG. 8. When the jaws 72 and 74 have been closed, the vertical solenoids 66A and 66B are actuated. In a preferred method, first one of the vertical solenoids 66A or 66B is fired and then the other, requiring less separation force to pull the end marker 1006 away from the length of marker material 1004. This vertical motion. lifts the jaw assembly 70 with the applicator member 200 or 300 and a separated marker 1012 clamped therebetween. The endmost marker 1006 is lifted and separated from the rest of the markers 1004 which are held by the solenoid 62, as shown in FIG. 9. When the jaw assembly 70 has been lifted and the endmost marker 1006 separated, the jaw assembly 70 may be opened to release the applicator member 200 or 300 with the separated marker 1012 applied thereto due to differences in the tackiness between the jaws 72 and 74 and the applicator 200 or 300. The take-up reel 80 is turned by the motor 84 to pull the next adjacent marker 1008 into position of the endmost marker 1006 and detected by the sensor 77, as shown in FIG. 7.

When the applicator 200 has received a marker, the separated marker 1012 is positioned near the bottom edge 206 of the applicator 200 and extending substantially parallel to the edge 206. To insert the marker 1012 into a book, the paddle 200 is inserted to a depth between opposing pages of a book. The side of the paddle 202 having the marker 1012 applied thereto is pressed against one of the pages to apply the marker 1012 to a page, as shown in FIG. 3. The paddle applicator portion 202 and blade applicator portion 302 are typically coated with a plasma coating or other substantially non-stick surface so that the difference in the adhesiveness of the surfaces will transfer the adhesive covered marker 1012 from the jaws 72 and 74 to the applicator, and from the applicator to the pages of the book. In uses wherein the markers 1004 have adhesive applied to only one side, the. blade 302 or applicator portion 202 includes a tacky surface for adhering to the non-adhesive coated side of the markers. However, the non-stick surface of the jaws 72 and 74 prevents the separated marker 1012 from adhering to the jaws so that the marker 1012 transfers to the blade 302 or applicator portion. It can be appreciated that the marker insertion apparatus 20 provides for rapidly advancing markers and for quickly and easily applying them to a paddle 200 or bayonet 300 and inserting them in the book and aligning markers 1012 with the spine of the book.

If the markers 1012 are being inserted between the pages of a book, the paddle 200 is utilized. The applicator. portion 202 is inserted between the pages with the edge 206 pressed against the spine. The side of applicator portion 202 retaining the marker 1012 is pressed against one of the pages, thereby transferring the marker 1012 to the book.

If the markers are being inserted in the spine of the book, the bayonet type applicator 300 is utilized. When the insertion apparatus 20 is ready with the marker 1006 and the jaws 72 and 74 positioned as shown in FIG. 7, the bayonet type applicator 300 is inserted with the handle 304 extending from the side of the slot 32 and the blade 302 positioned intermediate the jaws 72 and 74. When the sensors 76A and 76B detect the presence of the blade 302 in the correct receiving position, the solenoids 64A and 64B are actuated to clamp the jaws 72 and 74 against the endmost marker 1006 and the blade 302 of the bayonet type applicator 300. The. vertical solenoids 66A and 66B then pull the clamped jaw assembly 70 and the bayonet applicator 300 upward, thereby separating the endmost marker 1006. When the endmost marker 1006 has been pulled away from the next adjacent marker 1008, the jaws 72 and 74 open and the bayonet type applicator 300 may be removed with a separated marker 1012 applied thereto. The blade 302 of the applicator 300 may then be inserted into the spine of a book and the marker 1012 pressed against the binding for insertion into the spine, as shown in FIG. 4. Since the spine is more receptive to the adhesive applied to the marker 1012, the marker transfers from the blade 302 to the book.

In a first method, the applicator blade 302 is inserted intermediate the jaws 72 and 74 so that an end portion of the separated marker 1012 adheres to the end tackier portion 306.

In this manner, the marker 1012 adheres slightly more at the extended end of the blade 302. When the blade 302 is inserted into the spine of the book, the end of the marker 1012 adhering to the tackier portion 306 tends to pull the rest of the marker into the spine as the leading end is harder to release. When the marker 1012 is inserted to the desired insertion position, the blade 302 is pressed against the spine while insertion continues, after which the blade 302 is lifted from the spine. This motion breaks the grip on the end portion 306 and remainder of the blade 302 and transfers the marker 1012 cleanly from the applicator 300 and adheres the marker 1012 to the book spine. This method avoids some transferring problems associated with just pressing the blade 302 against the spine of the book, which tends to press the marker 1012 harder against the applicator and may make transferring the marker 1012 to the spine of the book more difficult.

In a second method, wherein markers 1012 with adhesive applied to only one face are utilized, the blade 302 is inserted in a similar manner. However, the tackiness of the adhesive on the one face of the marker 1012 is greater than the tackiness of the blade 302. Therefor, when the marker 1012 is pressed against the binding, the marker 1012 transfers from the bayonet 300 to the book binding.

It can be appreciated that with the present invention, a fast, simple and reliable method and apparatus are shown for removing an individual marker from a length of markers and inserting it into a book. It can be appreciated that the previously manually performed steps of removing markers from individual backing sheets are automatically performed using a more reliable roll of markers with the present invention. Moreover, the markers are removed and applied to an applicator member which can be easily inserted into a book for applying a marker without damaging, bowing or misaligning the markers.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A method of applying an adhesive-coated marker to the spine of a book, comprising the steps of:

attaching the marker to a bayonet-type applicator having a blade with an end portion having a tackier surface than the remainder of the blade, wherein at least a portion of the marker attaches to the end portion of the blade;

inserting the blade into the spine of a book until the marker is inserted a predetermined distance; and, pressing the marker against the spine while continuing to insert the blade, wherein the marker transfers from the blade to the spine.

2. A method of applying a marker to the spine of a book, the marker having an adhesive coated side and a non-adhesive coated side, comprising the steps of:

attaching the non-adhesive coated side of the marker to a bayonet-type applicator having a blade with a tacky surface;

inserting the blade into the spine of a book until the marker is inserted a predetermined distance; and, pressing the adhesive coated side of the marker against the spine, wherein the marker transfers from the blade to the spine.

3. A method according to claim 2, wherein the blade continues to be inserted while pressing the marker against the spine.

* * * * *

UNITED STATES PATENT AND TRADEMARK OFFICE
CERTIFICATE OF CORRECTION

PATENT NO. : 5,989,383 Page 1 of 1
DATED : November 23, 1999
INVENTOR(S) : Peter J. Zarembo, Donald P. DeVale, William R. Weber III, Norman L. Koning and Paul J. Michels It is certified that error appears in the above-identified patent and that said Letters Patent is hereby corrected as shown below:

Column 2,
Line 54, delete "types." and insert in place thereof -- types --.

Column 3,
Line 61, delete "supports." and insert in place thereof -- supports --.

Column 4,
Line 8, delete "insertion." and insert in place thereof -- insertion --.
Line 22, delete "74." and insert in place thereof -- 74 --.
Line 23, delete "7GB" and insert in place thereof -- 76B --.
Line 36, delete "applicator." and insert in place thereof -- applicator --.
Line 64, delete "binding." and insert in place thereof -- binding --.

Column 5,
Line 40, delete "material." and insert in place thereof -- material --.
Line 54, delete "sheet." and insert in place thereof -- sheet --.

Column 6,
Line 2, delete "the." and insert in place thereof -- the --.
Line 17, delete "motion." and insert in place thereof -- motion --.
Line 46, delete "the." and insert in place thereof -- the --.
Line 57, delete "applicator." and insert in place thereof -- applicator --.

Column 7,
Line 6, delete "The." and insert in place thereof -- The --.

Signed and Sealed this

Seventh Day of May, 2002

*Attest:*

JAMES E. ROGAN

*Attesting Officer* *Director of the United States Patent and Trademark Office*